April 26, 1966     K. ROTH     3,247,736

INVOLUTE GEAR COMBINATIONS

Filed Dec. 12, 1963     5 Sheets-Sheet 1

INVENTOR
KARLHEINZ ROTH

INVENTOR
KARLHEINZ ROTH
BY
Woodhams, Blanchard and Flynn
ATTORNEYS

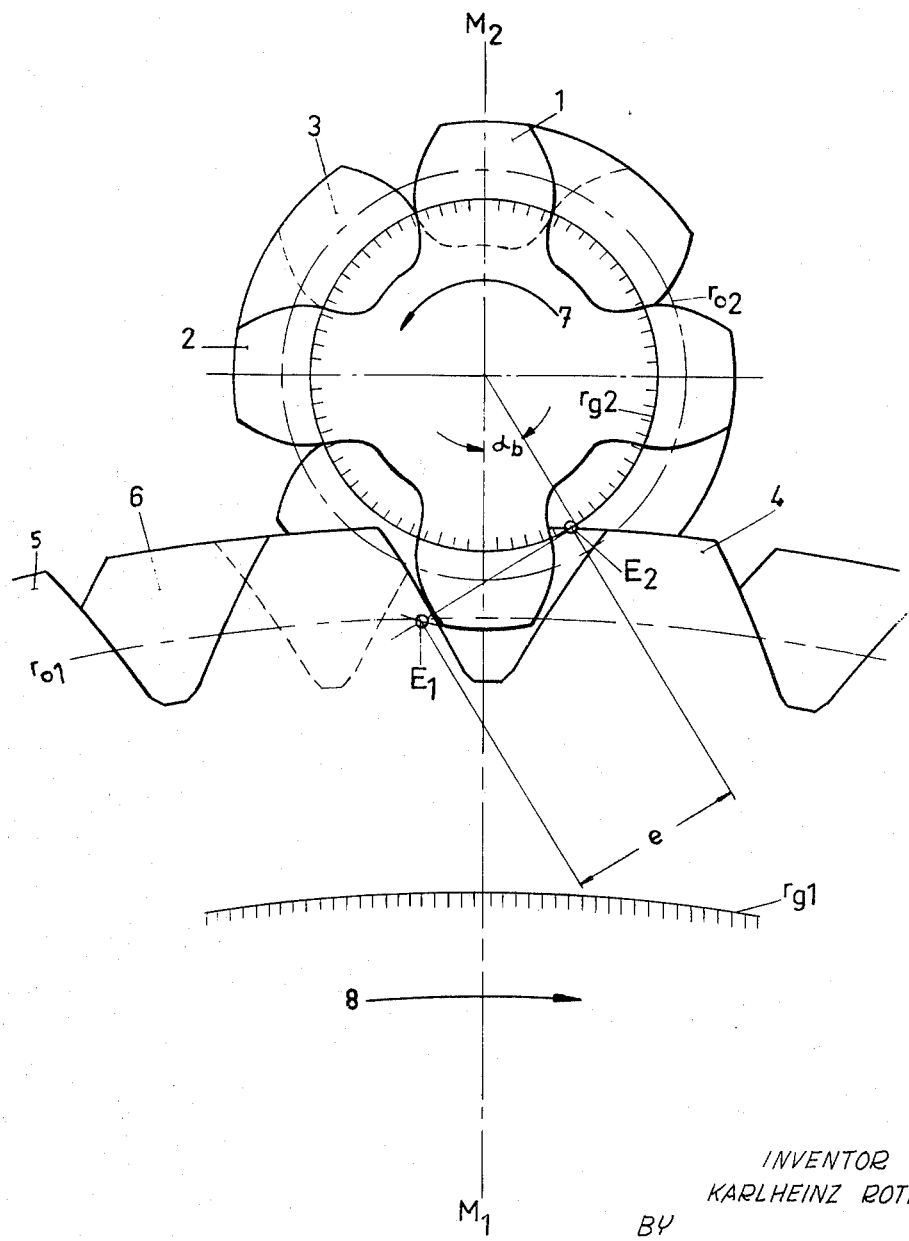

3,247,736
INVOLUTE GEAR COMBINATIONS
Karlheinz Roth, 4 Konrad-Celtis-Strasse,
Munich, Germany
Filed Dec. 12, 1963, Ser. No. 330,130
Claims priority, application Germany, Jan. 17, 1963,
S 83,289
5 Claims. (Cl. 74—462)

The invention relates to a combination of involute gears wherein the pinion has a small number of teeth, as hereinafter defined.

In precision work it is particularly desirable to use gears having only a small number of teeth. The cost of making a gear of given dimensions and given quality depends on the number of teeth; the smaller the number of teeth, the lower is the cost of production. If the number of teeth on the pinion is reduced then, for a constant gear ratio, the number of teeth on the wheel is reduced to the same extent. Thus, if only two teeth are used for the pinion instead of eight, the number of teeth on the wheel is also reduced by the factor 4. The centre distance, the pitch circles and thus the addendum circles and the cross-section of the gear casing are reduced to the same extent. Further, a low number of teeth is desirable for a gear combination which is required to achieve a high step-down or step-up ratio in the fewest possible stages. Especially for this purpose a reduction in the number of teeth for the pinion leads to a further reduction in the overall size of the stage.

The invention relates to a combination of involute gears wherein the virtual number of teeth on the pinion is no more than five. The virtual number of teeth $z_v$, also known as the normal number of teeth, is defined by the equation $$z_v = z/\cos^2 \beta_g \cdot \cos \beta_o$$

where $z$ is the number of teeth in normal section, $\beta_g$ is the helix angle on the base cylinder and $\beta_o$ is the helix angle on the pitch cylinder. In the gearing art, involute gears are preferred because they can be made with straight-sided cutters and any variation in the centre distance of the gears does not alter the momentary gear ratio as it would, for example, in cycloidal and spiral gear combinations. In worm gear and helical gear combinations, the axes intersect. Such gearing is therefore unsuitable where parallel axes are desired, for example in plate constructions. Even if intersecting axes bring about no structural disadvantages, the transmission efficiency of such gearing, for example worm gears, is generally lower than the efficiency of involute gears. A further disadvantage of worm gears is that step-up transmission is often impossible.

The invention aims to provide involute gearing with parallel gear axes, wherein the number of teeth on the pinion is so small that gear ratios are obtainable in one stage equal to those possible with worm gearing and without the overall size of the involute gears being much greater than that with worm gears. The gear combination according to the invention is suitable for pinion teeth in which the number $z_v$ is equal to or less than 5 and the gear combination comprises the following features:

(a) Both gears helical, the helix angle being defined by $$-0.35 z_v + 1.4 < \frac{b}{m_n} \sin \beta_o < 1.5$$

wherein $\beta_o$ = helix angle at pitch cylinder, $m_n$ = module $b$ = minimum width of tooth and $z_v$ = virtual number of teeth;

(b) The pinion has a small addendum and a large effective dedendum if it is the driver or a large addendum and small useful dedendum if driven, the profiles of the gear combination being complementary in respect of the tooth sides involved in power transmission;

(c) There is a profile deviation which is positive for the pinion in a step-down combination but negative in a step-up combination and positive for the wheel in a step-up combination.

As a result of an adequate profile engagement factor obtained by means of the invention, the required helix angle $\beta_o$ is much smaller than hitherto.

The reduction in the addendum or dedendum, as the case may be, and the profile deviation, may be adapted to one another so that the greater part of the line of action (relatively to the centre line and to the driver) lies on the side adjacent the point of final engagement. The pressure angle (half the angle of the sides of the basic rack profile) is preferably from 15° to 25° for a step-down combination and from 25° to 35° for a step-up combination. Further, in a step-down involute gear combination according to the invention it is preferred to use as the basic profile for the wheel the standard profile for precision work as laid down by German Industrial Standard No. 58400 (draft September 1963).

Three examples of the invention are illustrated in the accompanying drawing, wherein:

FIG. 7 illustrates a step-up combination, and

Figure 1:
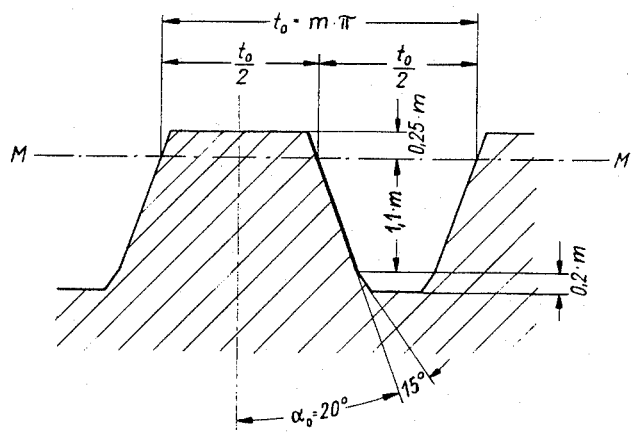
FIG. 1 is the basic rack profile in normal section for a pinion having a single tooth.

In the profile according to FIG. 1, the module $m$ is, as usual, taken as the reference parameter. All the measurements except the angles will be in millimetres when multipled by the module. The chain dotted line M—M is located so that the tooth thickness is equal to the tooth gap and equal to half the pitch $t_0$. The pitch $t_0$ amounts to 3.14159 modules. The addendum is 0.25 module, the dedendum 1.1 module and the bottom clearance 0.2 module.

Figure 3:
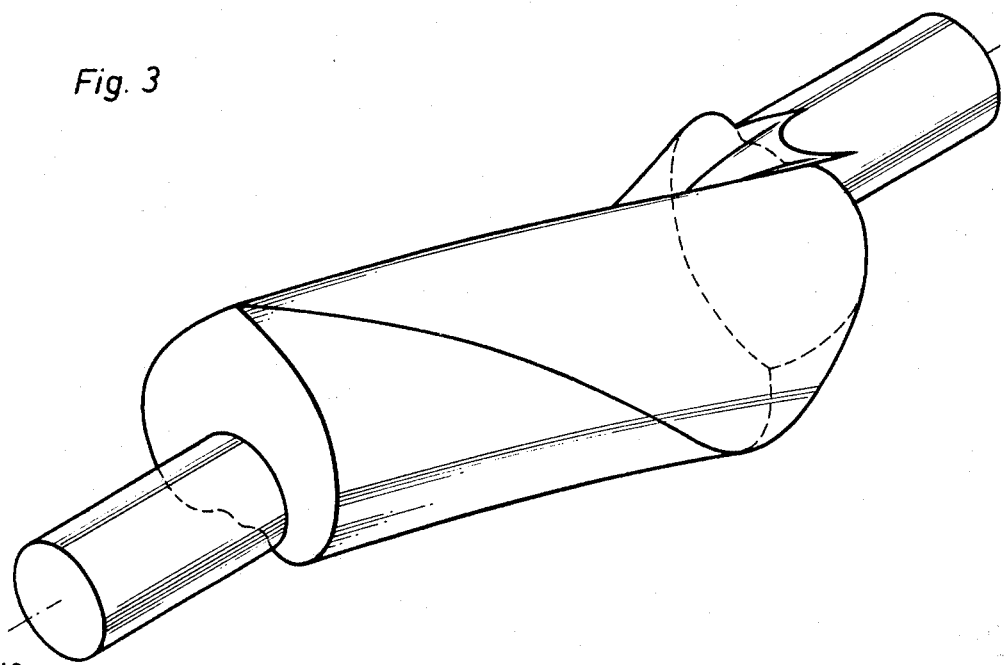
FIG. 3 is a perspective view of a pinion having a single tooth.

A helical gear made with these dimensions by a hob milling process is illustrated in FIG. 3. The face width amounts to about 6 modules; the helix angle at the pitch cylinder $\beta_o = 15.2°$. By using the helical tooth form, a transverse contact ratio larger than 1 is obtainable for the gear combination as a whole even though the transverse contact ratio in any one lamina plane of the combination is less than 1. The minimum helix angle necessary for engagement is limited by the formula $$-0.35 z_v + 1.4 < \frac{b}{m_n} \sin \beta_o < 1.5$$

In order to keep the axial forces on the gears to a minimum, a small helix angle is desirable. In addition, a small helix angle has a favourable effect on the form of the sides of the gears if they are made with a hob milling machine. The spread, i.e. the arc of the pitch circle between the two pitch cylinder lines through the points of intersection between a line passing through a side of the tooth and the two normal faces of the gearing, is chosen so that the transverse contact ratio $\epsilon$ of the combination is larger than 1. The mating profile can be a standard profile, preferably according to German Industrial Standard 58400 draft September 1963 for the precision industry. For the case where the pinion has one tooth ($z=1$), the spread is half the pitch ($t_0/2$), the wheel has 30 teeth and the helix angle $\beta_o$ is 15.2°, the transverse contact ratio $\epsilon$ will be equal to or larger than 1.1.

The standard profile for the procision industry according to German Industrial Standard No. 58400 is complementary to the basic profile of FIG. 1 in respect of the sides of the teeth involved in power transmission, i.e. the pinion of FIGS. 1 or 3 has a small addendum and a large dedendum, whilst the mating wheel has a large addendum and a small dedendum as far as the portions involved in power transmission are concerned. Thus, in the case of the standard profile according to German Industrial Standard 58400 draft September 1963, a portion of the dedendum available for power transmission is not used in the gear combination in question. This unutilised portion can, however, be utilised in co-operation with another gear. Naturally, it is also possible to provide a basic profile which has a small dedendum to begin with. Such a gear has the advantage of being somewhat stronger but the disadvantage of being useful only in combination with the pinion of FIGS. 1 or 3.

Figure 2:
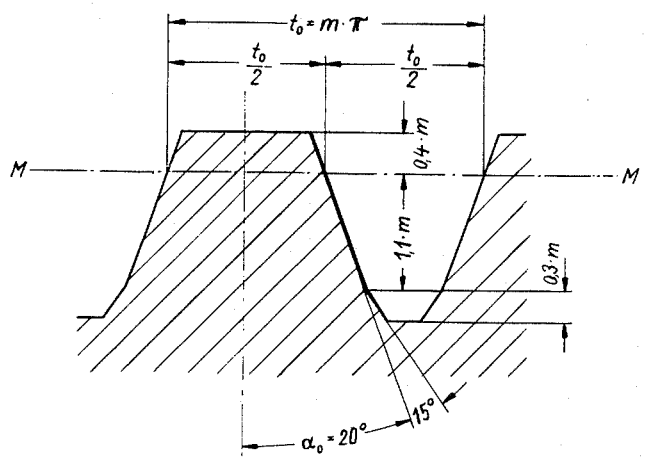
FIG. 2 is the basic rack profile in normal section for a pinion having two teeth.
Figure 4:
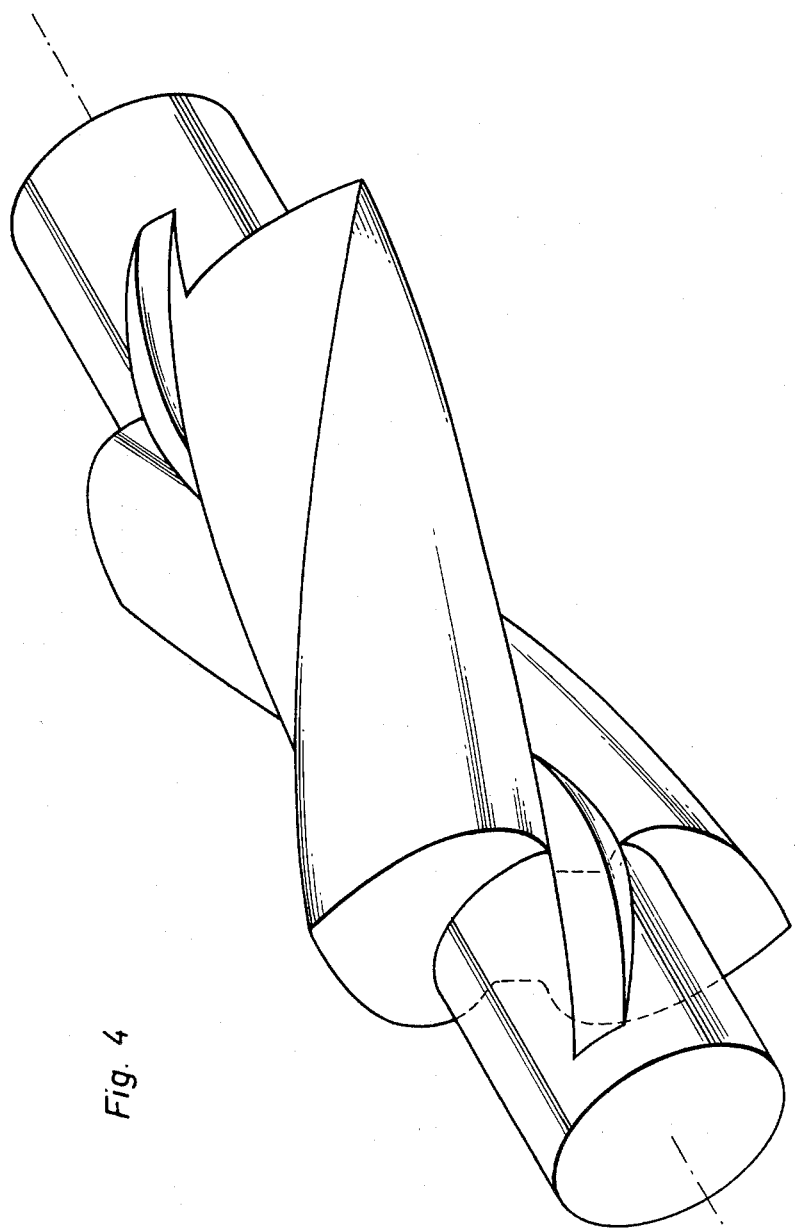
FIG. 4 is a perspective view of the pinion having two teeth.

The basic profile of FIG. 2 has, in relation to that of FIG. 1, a somewhat larger addendum, namely 0.4 module, and a somewhat larger bottom clearance of 0.3 module. The mating pinion (FIG. 4) likewise has a face advance of half the pitch ($t_0/2$). The minimum face width is obtained by the formula $$-0.35z_v + 1.4 < \frac{b}{m_n} \sin \beta_o < 1.5$$

The helix angle is 15.2°. The pinion of FIG. 4 can likewise be combined with a helical gear made according to German Industrial Standard 58400 draft September 1963. The basic profile of FIG. 2 is also complementary to the profile of German Standard 58400 draft September 1963. Further, it is possible, although less advantageous to use a mating helical gear according to German Industrial Standard No. 867.

Figure 5:
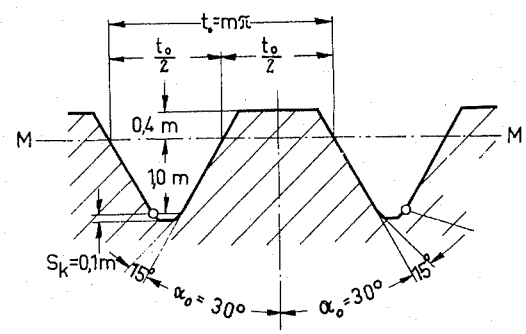
FIGS. 5 and 6 illustrate the two complementary basic profiles for a step-up combination.
Figure 6:
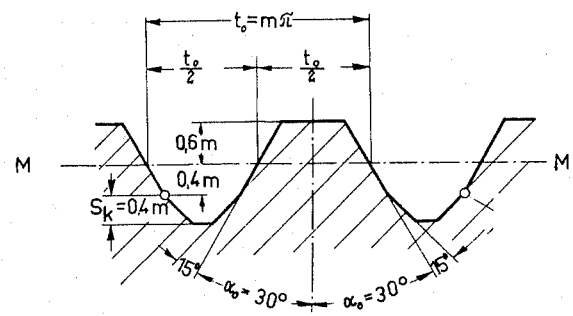

FIG. 5 shows the basic profile for a gear in a step-up combination. $m$ represents the module, to $t_0$ the pitch, $\alpha_0=30°$ half the angle of the side, $S_K=0.1\ m$ the bottom clearance. The reference line M—M represented by a chain dotted line is located so that the tooth thickness and tooth gap are equal. The point P designates the end of the useful tooth surface of the basic rack profile. FIG. 6 illustrates a basic profile complementary to the basic profile of FIG. 5 and the same references are used as in FIG. 5.

Figure 8:
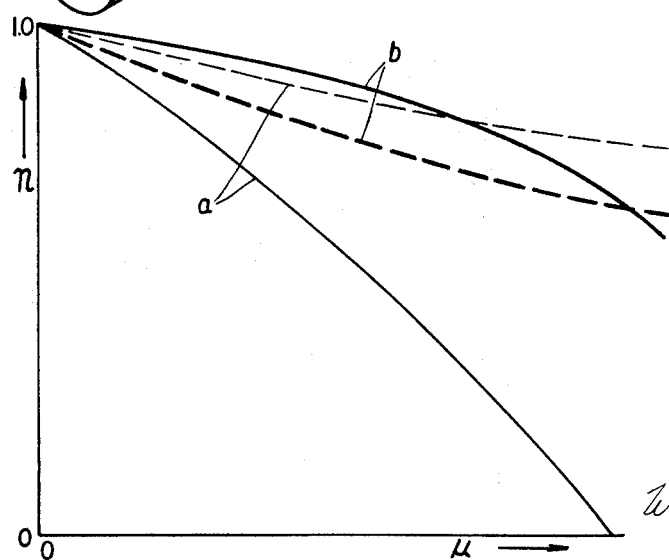
FIG. 8 is a graph showing the basic course of the efficiency of the step-up gearing according to FIG. 7.

A gear combination consisting of helical gears corresponding to the basic profiles of FIGS. 5 and 6 is illustrated in FIG. 7. The pinion 1 has four teeth and the wheel 4 has forty teeth. The drawing shows the front faces 2 and the rear faces 3 for the pinion 1 and the front faces 5 and rear faces 6 for the wheel 4. The transverse contact ratio for a laminate amounts to about 0.7 and when considering the face contact ratio the total engagement factor is 1.2. The direction of rotation of the gears 1 and 4 is represented by the arrows 7 and 8, respectively; thus, the illustrated version is a step-up gearing. The line of action E1, E2 is located principally on the righthand side of the line M1, M2, i.e. on the side adjacent the point of final engagement. Upon commencement of engagement (pushing friction) the sides of the teeth slide on one another only to a small extent because the point E1 lies close to the centre line M1, M2, whereas upon termination of engagement (pulling friction) at the point E2 the more intensive sliding of the tooth sides upon one another is less detrimental. FIG. 8 is a graphical representation of the momentary efficiency relatively to the coefficient of friction $\mu$ for a conventional gear combination (a) and for a laminate of the gear combination according to the invention (b). Although the number of teeth in the combination according to the invention is less, the efficiency is higher.

The curves for commencement of engagement are shown in full lines whilst the curves for termination of engagement are shown in broken lines. As evident from FIG. 8, the curves for the gear combination according to FIG. 7 lie closer to one another than the corresponding curves for conventional gear combinations. In particular, the drop in efficiency $\eta$ upon an increase in friction $\mu$ is not so great upon commencement of engagement and always lies considerably above zero. The principal advantage of this is that jamming of the gears upon commencement of engagement is avoided with the construction according to the invention even with a coefficient of friction $\mu=1.0$. Accordingly, the gear combination according to the invention is particularly suitable for difficult operating conditions in which the coefficient of friction may become particularly high as a result of infrequent servicing and/or the presence of sand or dust in the atmosphere. The graphs for a lamina normal section also apply in this case.

The general limitations for the helix angle $\beta_0$ have been mentioned previously. In a step-down combination $$-0.35z_v + 1.4 < \frac{b}{m_n} \sin \beta_o < -0.4z_v + 2,$$

whereas in a step-up combination $$0.6 < \frac{b}{m_n} \sin \beta_o < 1.5$$

For the profile deviation $x$ of the pinion $$0 < x < -0.35z_v + 2.5$$

in a step-down combination and $$x < 0$$

in a step-up combination and in general $$-0.125z_v + 0.2 < x < -0.35z_v + 2.5$$

The following are practical values for the profile deviation.

Step-down gearing:
  Five teeth on pinion, $x=+0.7$
  Four teeth on pinion, $x=+0.88$
  Three teeth on pinion, $x=+0.92$
  Two teeth on pinion, $x=+0.98$
  One tooth on pinion, $x=+1.03$ Step-up gearing:
  Three teeth on pinion, $x=-0.2$ and thus $x=+0.3$ for the wheel
  Four teeth on pinion, $x=-0.15$ and thus $x=+0.5$ for the wheel
  Five teeth on pinion, $x=-0.22$ and thus $x=+0.5$ for the wheel The following values are examples for the addendum and dedendum in step-down gear combinations. Addendum for the driver, useful dedendum for the driven:

One tooth on pinion _____ 0.25
  Two teeth on pinion _____ 0.4
  Three teeth on pinion _____ 0.5
  Four teeth on pinion _____ 0.6
  Five teeth on pinion _____ 0.7

The addendum of the driven gear and the corresponding dedendum of the driving gear may be 1.1 in this case.

For step-down gear combinations the driving gear may have an addendum of 0.4 and a dedendum of 1.0, without any modifications.

The addendum as referred to above is given by $$h_k = \tfrac{1}{2}[d_k - (z+2x)m]$$

wherein $d_k$=diameter of addendum circle, $z$=number of teeth, $x$=profile deviation factor and $m$=module.

The profile deviation $xm$ is the displacement of the reference line of the cutting tool from the pitch circle of the wheel. The reference line of the cutting tool is located where the tooth thickness is equal to the tooth gap.

What I claim is:
1. A combination of involute gears in which the shafts of the two gears are parallel to one another and wherein the virtual number of teeth on the pinion is no more than five, comprising the following features:
   (a) Both gears are helical and the helix angle is given by
   $$-0.35z_v + 1.4 < \frac{b}{m_n} \sin \beta_o < 1.5$$
   wherein $\beta_o$=helix angle at the pitch cylinder, $m_n$=module, $b$=minimum tooth width and $z_v$=virtual number of teeth;
   (b) the pinion has a small addendum and a large useful dedendum (difference between useful height of tooth and addendum) if it is the driver, or a large addendum and a small useful dedendum if it is the driven, the profiles of the combination being complementary in respect of the tooth sides involved in power transmission;
   (c) there is a profile deviation which is positive for the pinion in a step-down combination but negative in a step-up combination, and positive for the wheel in a step-up combination.

2. A combination according to claim 1 wherein the reduction in the addendum or dedendum, as the case may be, and the profile deviation are adapted to one another so that the greater part of the line of action (relatively to the centre line and relatively to the driver) lies on the side adjacent final engagement.

3. A step-down gear combination according to claim 1 wherein the pressure angle (half the angle of the sides of the basic rack profile) is between 15° and 25°.

4. A step-up gear combination according to claim 1 in which the pressure angle is between 25° and 35°.

5. A step-down gear combination according to claim 1 wherein the basic profile of the wheel is the standard profile for the precision industry according to German Industrial Standard No. 58400 draft September 1963.

References Cited by the Examiner
UNITED STATES PATENTS

| | | | |
|---|---|---|---|
| 2,321,696 | 6/1943 | Montelius | 74—466 |
| 2,486,770 | 11/1949 | Whitfield | 74—458 X |
| 2,530,173 | 11/1950 | Oldberg | 74—466 X |

FOREIGN PATENTS

| | | |
|---|---|---|
| 312,888 | 6/1929 | Great Britain. |
| 1,232,983 | 5/1960 | France. |

DON A. WAITE, *Primary Examiner.*